J. W. THROPP.
CLUTCH.
APPLICATION FILED AUG. 7, 1919.
1,380,271.
Patented May 31, 1921.
3 SHEETS—SHEET 2.
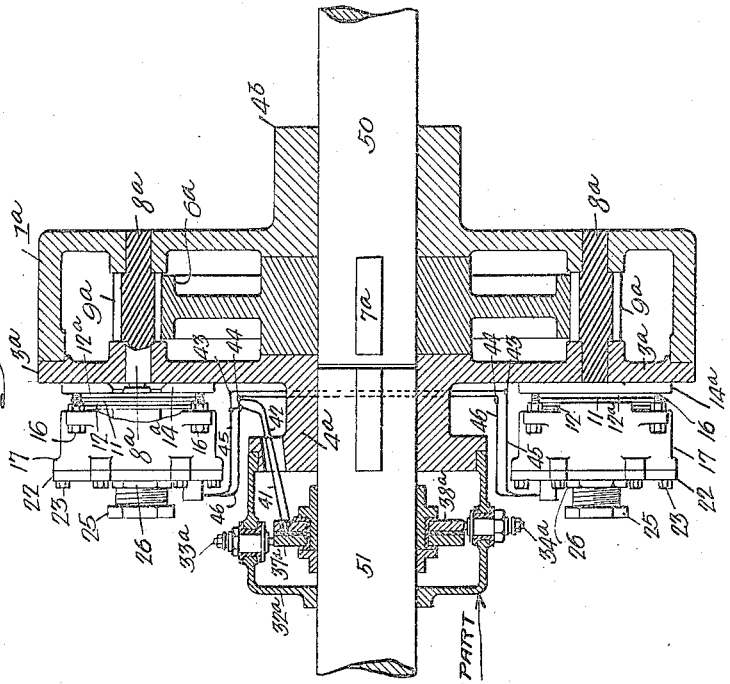
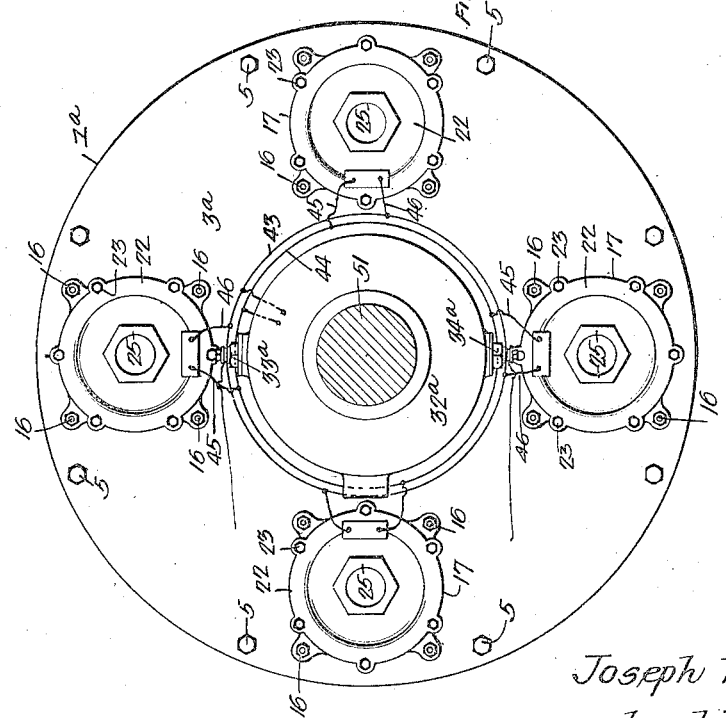
Inventor—
Joseph W. Thropp.
by his Attorneys—
Howson & Howson

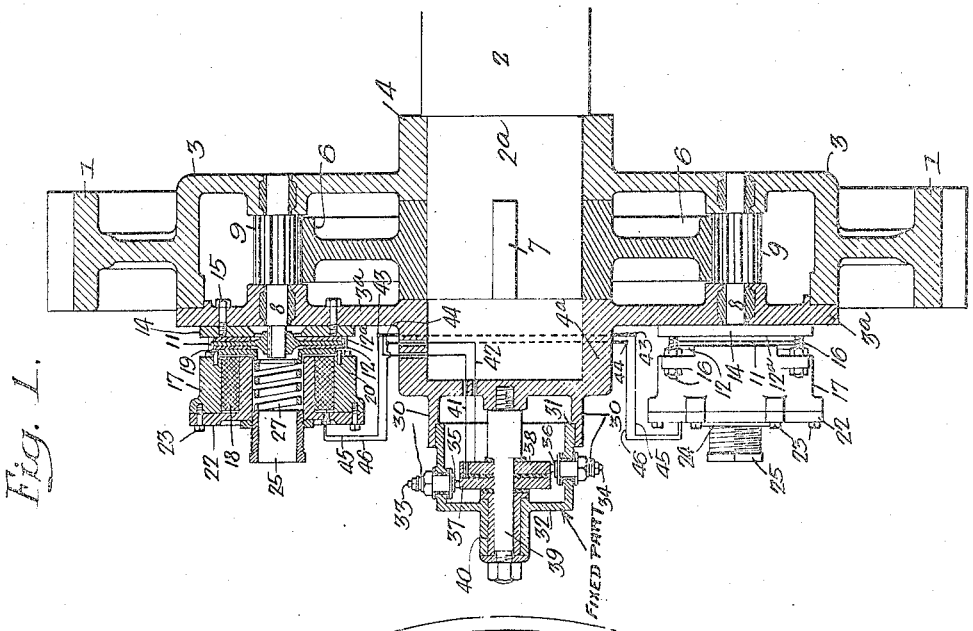
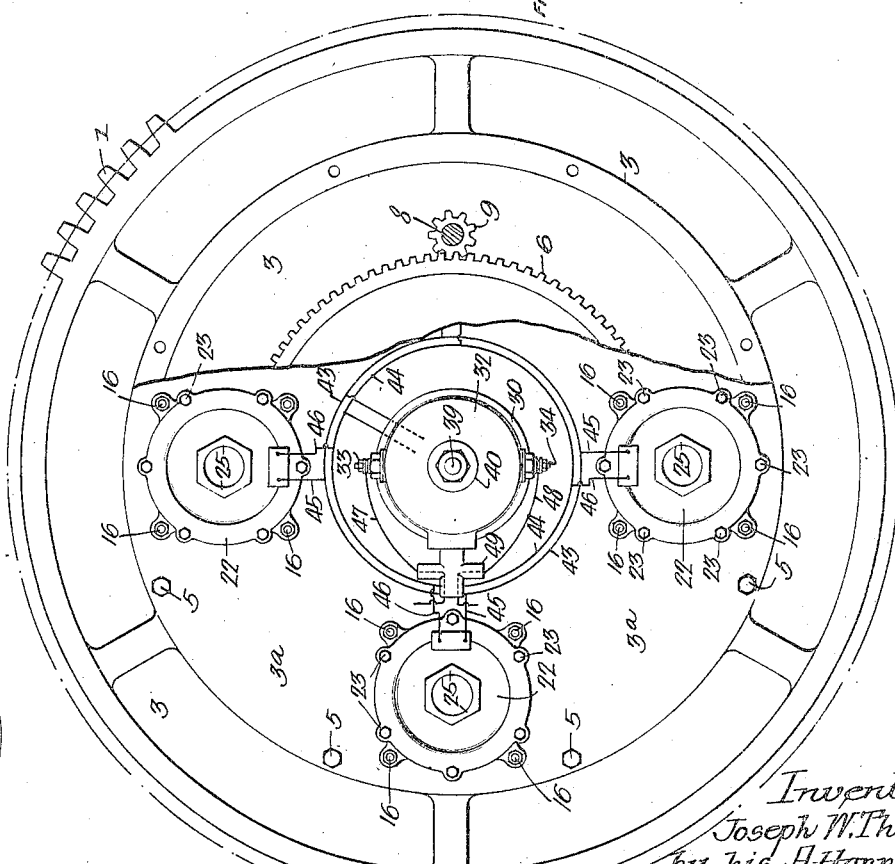

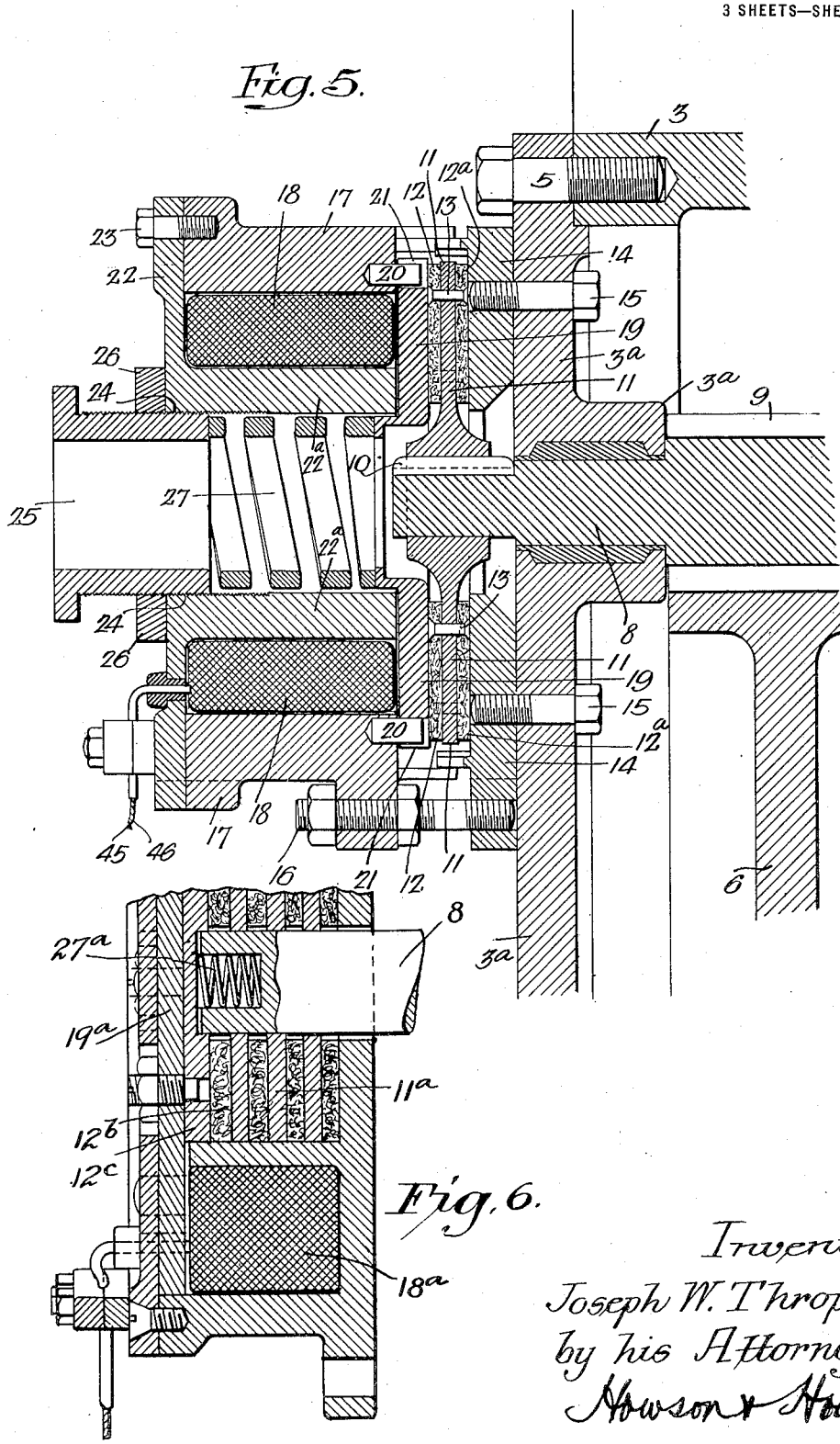

UNITED STATES PATENT OFFICE.

JOSEPH W. THROPP, OF TRENTON, NEW JERSEY.

CLUTCH.

1,380,271.  Specification of Letters Patent.  Patented May 31, 1921.

Application filed August 7, 1919. Serial No. 315,873.

*To all whom it may concern:*

Be it known that I, JOSEPH W. THROPP, a citizen of the United States, residing in Trenton, Mercer county, New Jersey, have invented certain Improvements in Clutches, of which the following is a specification.

My invention relates to clutches, and consists of certain improvements in that class of clutches and disconnecting couplings operated for the purpose of starting and stopping lines of shafting, or any power transmitting machinery, which are electrically controlled.

The main object of my invention is to provide simple means highly efficient in action for stopping line shafting, or any power transmitting machinery, instantly under full load, and for starting the same from rest.

A further object of my invention is to provide a special form of electrically and mechanically controlled braking means.

These and other features of my invention are more fully described hereinafter, reference being had to the accompanying drawings, in which:

Figure 1, is a sectional view of one form of clutch made in accordance with my invention, built in a gear wheel or driving pulley.

Fig. 2, is an end elevation of the structure shown in Fig. 1.

Fig. 3, is a sectional view of a disconnecting coupling, made in accordance with my invention, for starting and stopping line shafting, propeller shafts, and all kinds of transmission shafting.

Fig. 4, is an end elevation of the structure shown in Fig. 3.

Fig. 5, is a sectional view of one form of brake magnet and coöperating parts which I may employ with my improved clutch mechanism, and Fig. 6 illustrates a modification.

In the structure shown in Figs. 1 and 2, my improved clutching means are interposed between a power transmitting element, such as a gear wheel (or driving pulley) indicated at 1, and a second driven element, such as a roll or shaft 2, to be driven by said element 1 when said parts are connected or clutched in operative engagement. The means for accomplishing this result may be substantially as follows:

The power transmitting element 1 includes a web 3 and a hub 4; the latter being loose on a reduced portion 2ª at the end of the shaft or roll 2. A complemental part 3ª, of substantially the same cross sectional contour as the greater portion of the web 3, and having a hub shell or casing 4ª, is attached to said web 3, and bolts 5 or similar securing means may be employed for the purpose.

Disposed within the space or chamber formed by the parts 3 and 3ª of the power transmitting element 1, is a gear wheel 6, keyed or otherwise permanently secured to the end of the shaft or roll 2, whereby the latter may be turned, as indicated at 7.

Journaled in the portions 3 and 3ª of the power transmitting element 1, are the trunnions or spindles, 8 of a series of small pinions 9; a plurality of which must always be employed, though the number may vary within certain limits. In the present instance, I have shown four of these pinions.

When these pinions 9 are free to rotate, any motion applied to the power transmitting element 1 will carry said pinions around the gear wheel 6, and the latter being at rest, the pinions will rotate as in the usual form of sun and planet gearing. In order that these pinions 9 may be held so as to lock the power transmitting element 1 to said gear wheel 6, I provide clutching means therefor of substantially the character illustrated in Fig. 5.

As shown in Fig. 5, one end of each spindle or trunnion of each pinion 9 is keyed at 10 to a disk or plate 11, having annular friction pads 12 and 12ª on both faces of the same, which pads may be secured by rivets 13 or other securing means; the heads of the securing means being sunk below the surface of said pads. This disk 11 has slight longitudinal movement on the end of the trunnion or spindle.

Carried by the member 3ª of the power transmitting element 1, is a disk 14, which may be secured thereto by screw bolts 15 or other means, and secured to and carried by this disk, being preferably supported by stud bolts 16, is a shell or casing 17, inclosing a brake magnet 18. Disposed adjacent the magnet is a plate 19, which may engage the annular friction pad 12 on one side of the disk 11; the friction pad 12ª on the opposite side of said disk engaging the plate 14 carried by the member 3ª. The plate 19 is a floating plate, and it may have a slightly cupped center, if desired, and to insure against rotation of said plate 19, the shell 17 carrying the brake magnet may be provided with pins 20 adapted to rest in notches 21 formed in the edge of said plate.

The magnet-carrying element includes a plate 22, which may be secured to the casing 17 by screw bolts 23; said plate having a hub $22^a$ fitting within the brake magnet and having a hollow bore internally threaded at one end as at 24 for the reception of a hollow screw plug 25, which is preferably held in place by a lock nut 26 when properly adjusted. Interposed between this hollow screw plug 25 and the floating plate 19 is a spring 27 of relatively heavy tension yet less than the pulling power of the magnet, the function of which spring is to hold the floating plate 19 against the friction pad 12 of the disk 11, with the friction pad $12^a$ on the opposite side of said disk tightly pressed against the plate 11. In such position, the pinions 9 are held against rotation so that any movement applied to the power transmitting element 1 will effect rotation of the gear wheel 6. When it is desired to remove this clutching effect, the brake magnet 18 is energized, whereupon the floating plate 19 is withdrawn from engagement with the friction pad of the disk 11 and held out against the tension of the spring 27.

It will be understood, of course, that an arrangement in which the relation of these parts is reversed; that is to say, where the magnet is employed to hold the floating plate in gripping engagement with the friction pad of the disk 11, and a spring is employed to release such floating plate when the magnet is deënergized, is within the scope of my invention.

Current may be conveyed to the several brake magnets in the following manner: The hub portion $4^a$ of the plate $3^a$ carries an extension 30, in rotating engagement with a flange 31 of a fixed casing 32, (suitably supported), which casing carries binding posts 33 and 34, having brushes 35 and 36 for engagement with commutators 37 and 38 carried by a stem 39 projecting from the center of the hub $4^a$ and journaled in a suitable bearing 40 carried by the casing 32. From the commutators, suitable connectors 41 and 42 pass to wires 43 and 44, surrounding the hub $4^a$, and from which the desired leading-in wires 45 and 46 pass to the several brake magnets 18. Current conducting wires 47 and 48 connected to the binding posts 33 and 34 may be let in through a cross shaped supporting member 49 carried by the casing 32 supporting the binding posts.

The structure shown in Figs. 3 and 4 is substantially like that shown in Figs. 1 and 2, excepting that my invention is here shown as applied to a shaft coupling, or shaft connecting and disconnecting device. In this instance, the power transmitting element is in the form of a hollow shell $1^a$, with its hub $4^b$ loose on the shaft to be driven, indicated at 50, while the hub $4^a$ of the portion $3^a$ is keyed to a driving shaft 51.

The driven shaft 50 carries a gear wheel $6^a$ keyed thereto at $7^a$, which gear wheel is in engagement with pinions $9^a$, having trunnions $8^a$ journaled in the walls 3 and $3^a$ of the power transmitting element, and when said pinions are free the power transmitting element rotates freely on the end of the driven shaft 50; carrying said pinions $9^a$ around the gear wheel $6^a$, and the latter being at rest, the pinions are rotated by reason of their contact or engagement with the teeth of said gear wheel.

When the disks or plates 11 mounted on the ends of the trunnions of said pinions are clamped to the disks or plates $14^a$ carried by the portion $3^a$ of the power transmitting element, however, said pinions will be locked to the power transmitting element and the latter will then rotate the gear wheel $6^a$ mounted on the end of the shaft 50, and said shaft will be turned.

Means substantially similar to that illustrated with reference to the structure shown in Figs. 1 and 2 are provided for distributing current to the brake magnets carried by the plate $3^a$. In this instance the casing $32^a$ is suitably supported so that the shaft 51 carrying the commutator rings $37^a$ and $38^a$ is free to rotate within the same.

It will be understood of course, that in the operation of this structure braking means may be so employed that the spring will apply the braking power of the friction disks or plates 11, and the magnet will release the same when energized, as shown and described in Figs. 1 to 5 inclusive, or the magnet may apply the braking power of said friction disks or plates, and the spring may be arranged to release the same when said magnet is deënergized, both arrangements being within the scope of my invention.

In Fig. 6 I have shown a modification of my invention in which the latter arrangement is applied, and in this figure, 8 represents a pinion shaft which is recessed at its extremity to provide a chamber for the reception of spring $27^a$, which bears against the plate $12^c$, and in turn against the floating plate $19^a$. In this modification, $11^a$ are a series of steel plates connected to the shaft 8, and $12^b$ are a series of friction disks interposed between said plates. $18^a$ represents the magnet in the present instance, which acts upon the floating plate $19^a$ against the tension of the spring $27^a$. While I have shown in this modification, a plurality of steel disks and friction washers I have done this merely for the sake of showing the preferred construction, and I have in no way departed from the spirit of my invention, as shown in Figs. 1 to 5 inclusive, where is shown but a single steel plate. It will be understood that in either instance, a single steel plate or a plurality of plates could be equally well used, but in the modification a plurality of plates is the more preferable arrangement.

I have likewise provided the spring 27ª inclosed within a recess in the end of the shaft 8 merely to show the preferred form of this arrangement, with the structure reversed as in Fig. 6. In Fig. 6 I have shown the magnet surrounding the disks 11ª and 12ᵇ, but this is not a substantial departure from the construction shown in Figs. 1 to 5, since it is necessary in this reversal of parts that the magnet be in close proximity to the floating plate 19ª which it is to attract.

I claim:

1. In a clutch, the combination of a movable member, a gear wheel carried thereby, a power transmitting member, a plurality of pinions journaled in the power transmitting member in operative engagement with said gear wheel and free to turn around the same when the latter is at rest, friction devices for locking each pinion to the power transmitting member whereby the gear wheel and the movable member carrying the same may be turned by movement of the power transmitting member, and electrically actuated means operatively connected with said friction devices.

2. In a clutch, the combination of a movable member, a gear wheel carried thereby, a power transmitting member, a plurality of shafts journaled in the power transmitting member, pinions on said shafts in operative engagement with said gear wheel, means for locking each pinion to the power transmitting member whereby movement of the latter will be transmitted to the movable member, said means comprising a disk adjacent each pinion, a magnet adjacent said disk adapted when energized to attract the disk, and a spring bearing against the disk adapted to oppose the said attraction.

3. The combination of a movable member, a gear wheel carried thereby, a power transmitting member inclosing said gear wheel, a plurality of pinions journaled in the power transmitting member in operative engagement with said inclosed gear wheel and free to turn around the same when the latter is at rest, friction braking means for locking the pinions to the power transmitting member whereby the gear wheel and the movable member carrying the same may be turned by movement of the power transmitting member, and electrically actuated means operatively connected with said friction braking means.

4. The combination of a shaft, a toothed member carried by the same, pinions in engagement with said toothed member, a power transmitting element carrying said pinions, friction disks for locking said pinions to the power transmitting element whereby movement of the latter may be transmitted to the shaft, and electrically actuated means operatively connected with said pinion locking means.

5. The combination of a movable part, an annular member carried thereby, rotating members in operative engagement with said annular member and free to turn around the same when the annular member is at rest, a power transmitting member inclosing said annular member and the rotating members, and a spring actuated brake for locking the rotating members to the power transmitting member whereby the annular member in operative engagement therewith may be turned by movement of the power transmitting element.

6. The combination of a movable part, a gear wheel carried thereby, rotating pinions in operative engagement with said gear wheel and free to turn around the same when the gear wheel is at rest, a power transmitting member inclosing said gear wheel and the rotating pinions and having a portion loose on said movable part, a brake for locking the pinions to the power transmitting member whereby the gear wheel in operative engagement therewith may be turned by movement of the power transmitting element, and electrically actuated means for releasing said brake when the magnet thereof is energized.

7. A mechanical and electrical clutch for the purpose of starting and stopping a driven member under full load, having a master gear, an outer case, one or more pinions and shafts carried by said case; the pinions meshing with said master gear, friction plates carried by said pinion shafts, and electrically actuated means operatively connected with said friction plates; said plates serving to lock said pinions to the casing whereby the master wheel may be turned thereby.

8. A mechanical and electric clutch for the purpose of starting and stopping a driven member under full load, having a master gear of great diameter; a power transmitting member; one or more shafts carried by said member, each shaft being provided with a small pinion meshing with the master gear; friction devices carried by said pinion shafts; and electrically actuated means operatively connected with said friction devices, which serve to lock said pinions to the casing, whereby the master gear may be turned.

JOSEPH W. THROPP.